Dec. 7, 1926.
F. I. DU PONT
1,609,349
STILL AND PROCESS OF DISTILLING
Filed Nov. 9, 1923
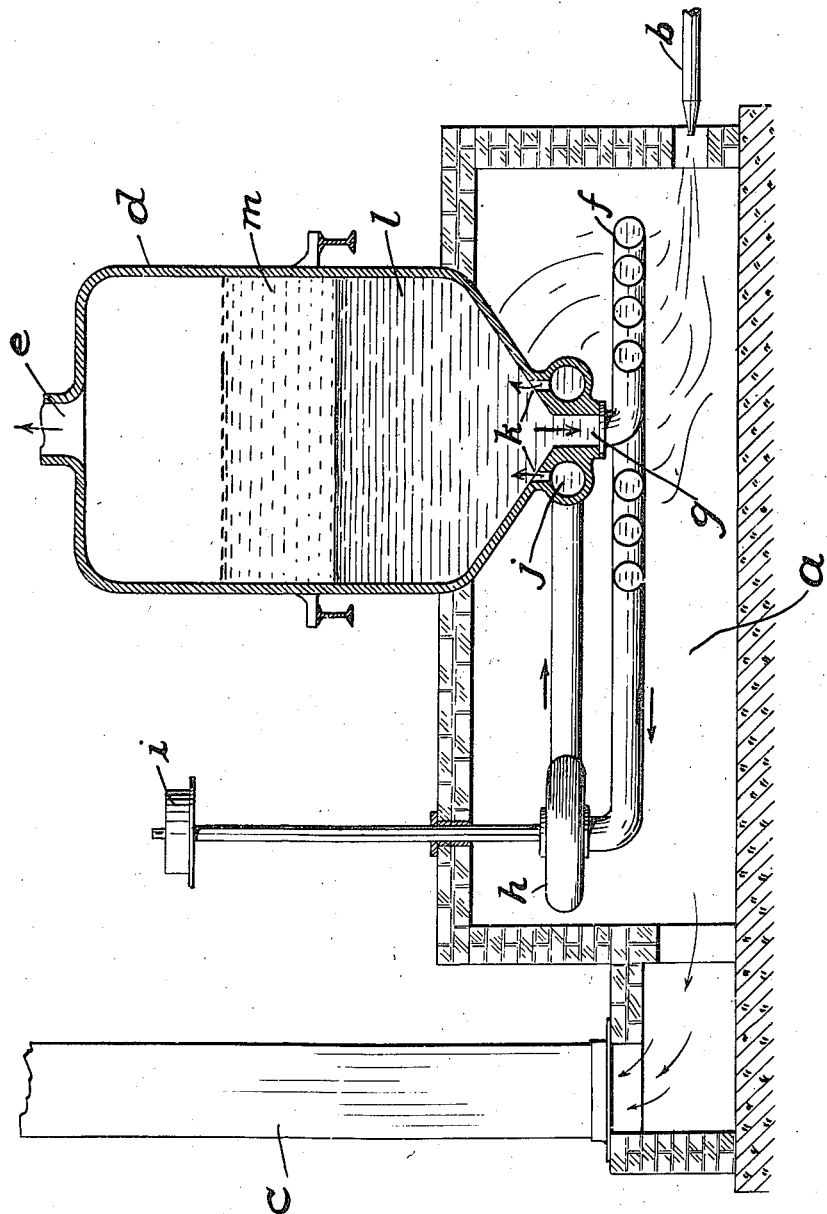
WITNESS:
Rob R Kitchel
INVENTOR
Francis I. du Pont
BY
Frank S. Busser
ATTORNEY.

Patented Dec. 7, 1926.

1,609,349

UNITED STATES PATENT OFFICE.

FRANCIS I. DU PONT, OF WILMINGTON, DELAWARE, ASSIGNOR TO DELAWARE CHEMICAL ENGINEERING COMPANY, OF WILMINGTON, DELAWARE, A CORPORATION OF DELAWARE.

STILL AND PROCESS OF DISTILLING.

Application filed November 9, 1923. Serial No. 673,711.

My invention relates to an improvement in stills, such as are used for the separation of various liquids by fractional distillation, and more particularly to such as are used for the treatment of petroleum.

Up to this time, various types of stills have been used, the commonest type consisting of a tank set over a furnace, by which the contents are heated, and connected with a condenser for recovery of the distillate. Another type of still comprises a casing provided with tubes in which the liquid to be distilled circulates and between which the fire to heat the contents passes. Still another variety of still comprises a tank set over a furnace and provided with a stirring device including chains which drag over the bottom of the still during distillation.

Such forms of still are found inefficient for the distillation of petroleum, since during the distillation chemical deposition takes place, which results in the deposit of asphalt-like materials. The materials deposited have a particular tendency to adhere to heated surfaces. They, therefore, adhere to the bottom of the simple form of still first mentioned above and to the tubes in the second above mentioned form.

The adherence of the deposited material results in a coating being formed, which prevents heat from being communicated to the liquid within the still to a great extent and which in turn becomes heated and carburized, with the result that the surfaces exposed to fire become red hot and unless great care is exercised the still will be ruined.

The tubed form of still above mentioned is better than the simple tank form and the dragging chains of the last mentioned form are still better, but none satisfactorily handle the problem presented by the deposited materials, and in order to maintain the efficiency of such stills it is necessary to shut them down frequently, and laboriously, and at considerable expense remove the carburized deposit. At the same time constant care must be exercised during their operation to avoid destruction of the fabric of the still due to overheating of the parts exposed to the fire.

Another disadvantage in the kind of stills which are in use is that as it becomes necessary to increase the surface devoted to absorbing heat from the fire, it also becomes necessary to increase equally, or almost equally the internal surface upon which asphalt-like materials can be deposited, and so to increase the difficulty and labor in cleaning the inside of the still at the frequent intervals when this is necessary. Manifestly if a still could be devised in which the surface devoted to absorbing heat could be increased without unduly increasing the surface where the deposition of asphalt-like products takes place, this would be desirable.

Now the object of my invention is to provide a still in which the disadvantages and expense arising from the deposit of asphalt-like materials will be eliminated.

A further object of my invention is to provide a still of increased efficiency and economy.

Having now indicated, in a general way, the nature, purpose and advantage of my invention, I will proceed to a detailed description of a preferred embodiment thereof, as applied to the distillation of petroleum, with reference to the accompanying drawings, in which the figure is a sectional view of a still embodying my invention.

$a$ represents a furnace of any desirable construction provided with an oil burner $b$, as a source of heat, and with a stack $c$ to take off the products of combustion.

Suitably supported in relation to the furnace is a vessel, or still, $d$, provided at its top with a suitable outlet $e$, adapted for the passage of vapors and intended for connection with a condenser, not shown.

Beneath the vessel $d$ and in the path of the flame from burner $b$ is a coil $f$, one of the ends of which is connected to the bottom of the vessel, as at $g$, while the other end is connected to the inlet side of a pump $h$, driven by means of power connected to a pulley $i$. The outlet side of the pump is connected to an annular chamber $j$ about the bottom of the vessel and in communication with the interior of the vessel through narrow ports $k$.

The bottom portion of the vessel and the coil are filled with lead $l$, which upon heating becomes fluid and the body of petroleum $m$ is superimposed or floated on the fluid lead.

In operation, the burner is lighted and the lead becomes fluid. Petroleum is introduced into the vessel and due to its lower specific gravity floats on the metal. The metal in the coil is heated by the burner and is circulated by the pump from the coil to the tank and back to the coil transferring heat to the petroleum while it is in the tank. The narrow ports $k$, by which the metal enters the vessel in connection with proper regulation of the pump, preclude any violent agitation of the surface of the metal such as would produce a vortex and tend to carry petroleum down into the heating coil.

By virtue of the transmission of heat to the petroleum through the body of fluid lead in the bottom of the vessel, when deposition of asphalt-like products takes place, there is no surface for such products to adhere to, and the only result of deposition is for the body of petroleum to become thicker, which it may do, almost to the point of solidity, without damage to the apparatus and without presenting any problem or material expense in its removal.

By virtue of the use of a fluid heat transmitting medium, a more efficient transmission of heat is obtained, since it is relatively easy to transmit heat from one liquid to another, while it is difficult to transmit heat from a gas to a solid or from a gas through a solid to a liquid. Therefore, in apparatus used heretofore, a large surface exposed to the fire was necessary, but by virtue of my invention there is no necessity to unduly increase the size of the still or the surface over which the petroleum products are actually exposed to the heat transmitting medium.

By virtue of the circulation of the heat transmitting medium between the coil and vessel, there is afforded a greater surface for the absorption of heat from the furnace than if a similar vessel were directly heated.

In describing my above invention, I have described a preferred embodiment thereof, but I do not intend that my invention shall be limited to any particular details of construction or to the use of any particular metal as a heat transmitting medium, as it is obvious that the structural details may be modified and other metals, having the requisite specific gravity and fluidity at temperatures required for the distillation of whatever is to be distilled, may be substituted for lead, which is mentioned as a suitable and economical metal.

It will also be noted that my invention is not limited to stills used purely for distilling or separating, but can be applied to those forms of still in which petroleum products are treated under pressure for the purpose of "cracking".

Having now fully described my invention, what I claim and desire to protect by Letters Patent is—

1. A still comprising a vessel, a coil connected with said vessel, means to heat the coil, a fluid metal in said vessel and coil adapted to support a fluid in the vessel to be distilled and transmit heat thereto, and means to circulate the fluid metal between the coil and vessel, said last mentioned means being adapted to return the fluid metal to the vessel from the coil below the upper surface of the metal in the vessel.

2. A still comprising a vessel, a coil outside and in communication with the vessel, a metal in the coil and vessel adapted when fluid to support and transmit heat to a body of fluid to be distilled, means to heat the coil to render the metal fluid, and means to circulate the fluid metal from the vessel through the coil and back to the vessel in an unbroken stream.

3. A still comprising a vessel, a coil below said vessel, a body of lead in said vessel and coil, means to heat the bottom of the vessel and said coil to render the lead fluid, and means to circulate the fluid lead in a continuous unbroken stream between said vessel and coil.

4. An apparatus for heating petroleum products for distilling or cracking, comprising a vessel for containing fluid metal for heating the petroleum products, there being a heating chamber surrounding the lower portion of the vessel, a metal heating coil in the heating chamber having an inlet and an outlet both connected to the lower end of the vessel, and means for circulating the metal from the vessel, through the coil and back to the vessel.

5. The process of distilling petroleum comprising floating a body of petroleum to be distilled on a fluid metal in a vessel, withdrawing a part of the fluid metal to a point outside the vessel, applying heat to the fluid metal while outside of the vessel, and returning the heated fluid metal to the vessel in an unbroken stream.

6. The process of distilling petroleum comprising floating the petroleum on a body of fluid metal in a vessel, withdrawing part of the metal to a point outside the vessel, applying heat to the metal while outside of the vessel, returning the heated metal to the vessel, and controlling the return of the heated metal to avoid undue disturbance of the surface of the metal in the vessel.

7. A still comprising a vessel, an annular chamber about the bottom of the vessel having restricted communication with the interior of the vessel, a coil spaced from and in communication with said vessel and with said annular chamber, a metal in said vessel and coil adapted when fluid to support and transmit heat to a liquid to be distilled in said vessel, means to heat said coil to render said metal fluid, and means to effect a circulation of fluid metal between said vessel and coil through said annular chamber.

In testimony of which invention, I have hereunto set my hand, at Wilmington, Delaware, on this 6th day of November, 1923.

FRANCIS I. DU PONT.